US012695562B2

(12) United States Patent (10) Patent No.: US 12,695,562 B2
van Houtum (45) Date of Patent: Jul. 28, 2026

(54) APPARATUS FOR COMMUNICATION AND SENSING

(71) Applicant: NXP B.V., Eindhoven (NL)

(72) Inventor: Wilhelmus Johannes van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 421 days.

(21) Appl. No.: 18/476,397

(22) Filed: Sep. 28, 2023

(65) Prior Publication Data

US 2024/0187158 A1 Jun. 6, 2024

(30) Foreign Application Priority Data

Dec. 2, 2022 (EP) ..................................... 22211209

(51) Int. Cl.
H04L 5/00 (2006.01)
(52) U.S. Cl.
CPC ............ H04L 5/0044 (2013.01); H04L 5/001 (2013.01)
(58) Field of Classification Search
None
See application file for complete search history.

(56) References Cited

U.S. PATENT DOCUMENTS

| | | | |
|---|---|---|---|
| 2016/0278120 A1* | 9/2016 | Ro | H04W 74/0808 |
| 2021/0286045 A1 | 9/2021 | Bayesteh et al. | |
| 2021/0392516 A1* | 12/2021 | Park | H04L 5/0048 |
| 2023/0188275 A1* | 6/2023 | Ren | G01S 13/347 |
| | | | 370/329 |

OTHER PUBLICATIONS

Tlouyamma et al.: "Modelling and theoretical analysis of cooperative spectrum sensing performance" 2016 International Conference on Advances in Computing and Communication Engineering (ICACCE), IEEE, Nov. 28, 2016 (Nov. 28, 2016), pp. 81-84.
ETSI—3GPP TR 38.913: "Study on Scenarios and Requirements for Next Generation Access Technologies"; 3GPP TR 38.913 version 14.2.0 Release 14, May 2017; 41 pages.

(Continued)

*Primary Examiner* — Diane L Lo

(57) ABSTRACT
An apparatus configured to control a transmitter to provide for generation of a data frame, the data frame having a fixed length and fixed predetermined number of sub-frames, and each sub-frame comprises a predetermined number of slots based on a carrier frequencies, and each slot includes a fixed number of symbol time periods; receive a data stream for transmission; define at least one communication-slot for transmitting of data-symbols that represent said data stream and at least one sense-slot for transmitting a predetermined sense-symbol for use in sensing an environment; wherein the generation of the data frame further comprises: the generation of the data-symbols, in the respective symbol time periods of the at least one communication-slot, according to a predetermined encoding protocol, and the generation of the predetermined sense-symbol in at least one symbol time period of the respective at least one sense-slot.

22 Claims, 4 Drawing Sheets

700

701 PROVIDING FOR GENERATION OF A DATA FRAME

702 RECEIVING A DATA STREAM FOR TRANSMISSION

703 DEFINING, FOR THE SLOTS OF EACH SUB-FRAME, AT LEAST ONE COMMUNICATION-SLOT FOR TRANSMITTING OF DATA-SYMBOLS

704 GENERATING THE DATA-SYMBOLS THAT REPRESENT THE DATA STREAM

705 GENERATING THE PREDETERMINED SENSE-SYMBOL IN AT LEAST ONE SYMBOL TIME PERIOD

(56) References Cited

OTHER PUBLICATIONS

Zhou Fuhui et al.: "Energy-Efficient NOMA Enabled Heterogeneous Cloud Radio Access Networks", IEEE Network, IEEE Service Center, New York, NY, US, vol. 32, No. 2, Mar. 1, 2018 (Mar. 1, 2018), pp. 152-160.

Samsung: "Discussion on Resource Allocation Mechanisms for NR V2X", 3GPP Draft; RI-1812987 Discussion on Resource Allocation Mechanisms for NR V2X, 3rd Generation Partnership Project (3GPP), Mobile Competence Centre ; 650, Route Des Lucioles ; F-06921 Sophia-Antipolis, vol. RAN WGI, No. Spokane, USA; Nov. 12, 2018-Nov. 16, 2018, Nov. 11, 2018 (Nov. 11, 2018).

Marc Barberis Understanding and Modeling the 5G NR Physical Layer—MathWorks™ promotional-material: Matlab™—Selected transcripts info of: Watch the "5G Explained" Series; Matlab Expo 2019; 70 Pages.

ETSI—3GPP TS 38.213: "NR; Physical layer procedures for control " 3GPP TS 38.213 version 15.6.0 Release 15, Jul. 2019, 110 pages.

ZTE et al.: "Mode 2 resource allocation schemes on sidelink"; 3GPP Draft; RI-1908795 Mode 2 Resource Allocation Schemes on Sidelink, 3rd Generation Partnership Project (3GPP), Mobile Competence Centre ; 650, Route Des Lucioles ; F-06921 Sophia-Antipolis Cedex; vol. RAN WGI, No. Prague, CZ; Aug. 26, 2019-Aug. 30, 2019 ; Aug. 17, 2019 (Aug. 17, 2019), 11 pages.

Barneto, Carlos Baquero et al., Full-Duplex OFDM Radar With LTE and 5G NR Waveforms: Challenges, Solutions, and Measurements, IEEE Transactions on Microwave Theory and Techniques, vol. 67, No. 10, IEEE, Piscataway, NJ, USA, Oct. 1, 2019, pp. 4042-4054.

ETSI—3GPP TS 38.212: "NR; Multiplexing and channel coding" 3GPP T Release 15 5 S 38.212 V15.9.0 (Jun. 2020), 101 pages.

ETSI—3GPP TS 38.211: "NR; Physical channels and modulation" 3GPP TS 38.211 version 16.2.0 Release 16, Jul. 2020, 136 pages.

ETSI—3GPP TS 38.214: "NR; Physical layer procedures for data " 3GPP TS 38.214 version 16.2.0 Release 16, Jul. 2020, 167 pages.

Wu, Jun et al., "Optimisation of virtual cooperative spectrum sensing for UAV-based interweave cognitive radio system", IET Communications, 2vol. 15, No. 10, The Institution of Engineering and Technology, GB, 021-01-29, pp. 1368-1379.

Liyanaarachchi et al: "Optimized Waveforms for 5G-6G Communication with Sensing: Theory, Simulations and Experiments," IEEE Transactions on Wireless Communications, vol. 20, No. 12, pp. 8301-8315, Dec. 2021.

* cited by examiner

700

701 — PROVIDING FOR GENERATION OF A DATA FRAME

702 — RECEIVING A DATA STREAM FOR TRANSMISSION

703 — DEFINING, FOR THE SLOTS OF EACH SUB-FRAME, AT LEAST ONE COMMUNICATION-SLOT FOR TRANSMITTING OF DATA-SYMBOLS

704 — GENERATING THE DATA-SYMBOLS THAT REPRESENT THE DATA STREAM

705 — GENERATING THE PREDETERMINED SENSE-SYMBOL IN AT LEAST ONE SYMBOL TIME PERIOD

APPARATUS FOR COMMUNICATION AND SENSING

CROSS-REFERENCE TO RELATED APPLICATIONS

This application claims priority under 35 U.S.C. § 119 to European patent application no. 22211209.6, filed 2 Dec. 2023, the contents of which are incorporated by reference herein.

FIELD

The present disclosure relates to an apparatus configured to control a transmitter. The disclosure also relates to a method and an electronic device including the apparatus, a transmitter and a receiver.

BACKGROUND

Communication standards may use carrier frequencies that are sufficiently high to be used for discerning information about the environment that surrounds a transmitter by analyzing a signal that has reflected from the environment.

SUMMARY

According to a first aspect of the present disclosure there is provided an apparatus configured to control a transmitter, the apparatus including a processor configured to provide for generation of a data frame for transmission by the transmitter at a selected one of a plurality of predetermined carrier frequencies, the data frames having a fixed predetermined frame length, wherein each data frame includes fixed predetermined number of sub-frames, and each sub-frame includes a predetermined number of slots based on which of the plurality of predetermined carrier frequencies is selected, and wherein each slot includes a fixed number of symbol time periods. The apparatus is further configured to receive a data stream for transmission, and define, for the predetermined number of slots of each sub-frame, at least one communication-slot for transmitting of data-symbols that represent said data stream and at least one sense-slot for transmitting a predetermined sense-symbol for use in sensing an environment proximal said transmitter. The generation of the data frame further includes the generation of the data-symbols that represent the data stream, in the respective symbol time periods of the at least one communication-slot, according to a predetermined encoding protocol, and the generation of the predetermined sense-symbol in at least one symbol time period of the respective at least one sense-slot.

In one or more embodiments, the predetermined number of slots in each sub-frame includes at least two and each sense-slot excludes data-symbols that represent the data stream.

In one or more embodiments, the processor being configured to generate data-symbols that represent said data stream includes the generation of the data-symbols that represent the data stream in the respective symbol time periods of the communication-slots and the symbol time periods of the sense-slots that are not occupied by the predetermined sense-symbol.

In one or more embodiments, the time period between consecutive sense-symbols is constant.

In one or more embodiments, the processor is configured such that the position of the at least one symbol time period in the at least one sense-slot of each sub-frame during which the sense-symbol is generated is selected to provide said constant time period between consecutive sense-symbols.

In one or more embodiments, the sense-symbol has a duration that extends over at least two consecutive symbol time periods in the sense-slots.

In one or more embodiments, each sub-frame includes at least one guard interval as well as said predetermined number of slots.

In one or more embodiments, the processor is configured to define the at least one sense-slot per sub-frame as one of the slots directly subsequent said guard interval, and said processor is configured to, in the sense-slots that are directly subsequent said guard interval, generate said sense-symbol such that it extends over said guard interval and a first of the symbol time periods.

In one or more embodiments, the sense-symbols generated by said processor have a duration of at least two symbol time periods and include a first symbol time period including a symbol time period having a data-symbol therein and at least a second symbol time period directly adjacent the first symbol time period and including a copy of the data-symbol in the first symbol time period.

In one or more embodiments, the processor is configured to define the at least one sense-slot per sub-frame as one of the slots directly subsequent said guard interval, and said processor is configured to, in the sense-slots that are directly subsequent said guard interval, generate said sense-symbol such that it extends over said guard interval and a first of the symbol time periods, and the first of the symbol time periods includes a data-symbol and the guard interval includes a copy of the data-symbol in the first of the symbol time periods, and the processor is configured to record sense-symbol-description information that is indicative of the form of the sense-symbols and provide the sense-symbol-description information to a receiver for use in detecting the sense-symbols in a received signal that was transmitted by the transmitter and reflected from the environment.

In one or more embodiments, the apparatus includes a receiver configured to receive a signal that was transmitted by the transmitter and reflected from an environment proximal the transmitter and proximal the receiver, detect the sense-symbols in said received signal, and determine one or both of a range to or a velocity of an object in said environment based at least on range-Doppler processing of said sense-symbols.

According to a second aspect of the present disclosure there is provided a method for an apparatus, such as the apparatus of the first aspect, including a processor that is configured to control a transmitter, and the method including providing for generation of a data frame for transmission by the transmitter at a selected one of a plurality of predetermined carrier frequencies, the data frames having a fixed predetermined frame length, wherein each data frame includes fixed predetermined number of sub-frames, and each sub-frame includes a predetermined number of slots based on which of the plurality of predetermined carrier frequencies is selected, and wherein each slot includes a fixed number of symbol time periods. The method further includes receiving a data stream for transmission, and defining, for the predetermined number of slots of each sub-frame, at least one communication-slot for transmitting of data-symbols that represent said data stream and at least one sense-slot for transmitting a predetermined sense-symbol for use in sensing an environment proximal said transmitter. The providing for generation of the data frame further includes generating the data-symbols that represent the data stream, in the respective symbol time periods of the at least one communication-slot, according to a predetermined encoding protocol, and generating the predetermined sense-symbol in at least one symbol time period of the respective at least one sense-slot.

In one or more embodiments, the method includes defining the position of the at least one symbol time period in the at least one sense-slots of each sub-frame during which the sense-symbol is generated to provide a constant time period between consecutive sense-symbols.

In one or more embodiments, the method includes generating the data-symbols that represent the data stream in the respective symbol time periods of the communication-slots and the symbol time periods of the sense-slots that are not occupied by the predetermined sense-symbol.

According to a third aspect of the present disclosure there is provided a electronic device including the apparatus the first aspect.

According to a fourth aspect of the present disclosure there is provided a computer program or a computer readable medium including a computer program configured to perform the method of the second aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

The present examples relate to a time-division-multiple-access (TDMA) based method and apparatus for transmitting information that comprises both symbols for the purpose of communication and for the purpose of sensing the environment around a transmitter. Communication standards such as 5G-New Radio, 5GNR, use carrier frequencies that can be as high as 60 or 70 GHz. These and other frequencies may be effectively used to sense the environment, that is detect the range and/or velocity of objects around the transmitter.

Thus, apparatuses may be configured to sense the distance to one or more objects in the physical environment around a transmitter by processing signals that have been transmitted by the transmitter, reflected from said one or more objects and then received. In one or more examples, it may be possible to sense the velocity of one or more objects in the physical environment around the transmitter by processing signals that have been transmitted by the transmitter, reflected from said one or more moving objects and then received. The methods required to sense the environment may be known to those skilled in the art. The present examples relate to how to provide sense-symbols, that is the part of a signal used for the purpose of sensing the environment, alongside data-symbols, that is the part of the signal used for the purpose of conveying information, such as for calls, control or transferring data, such as to and/or from the Internet, for example.

Figure 1:
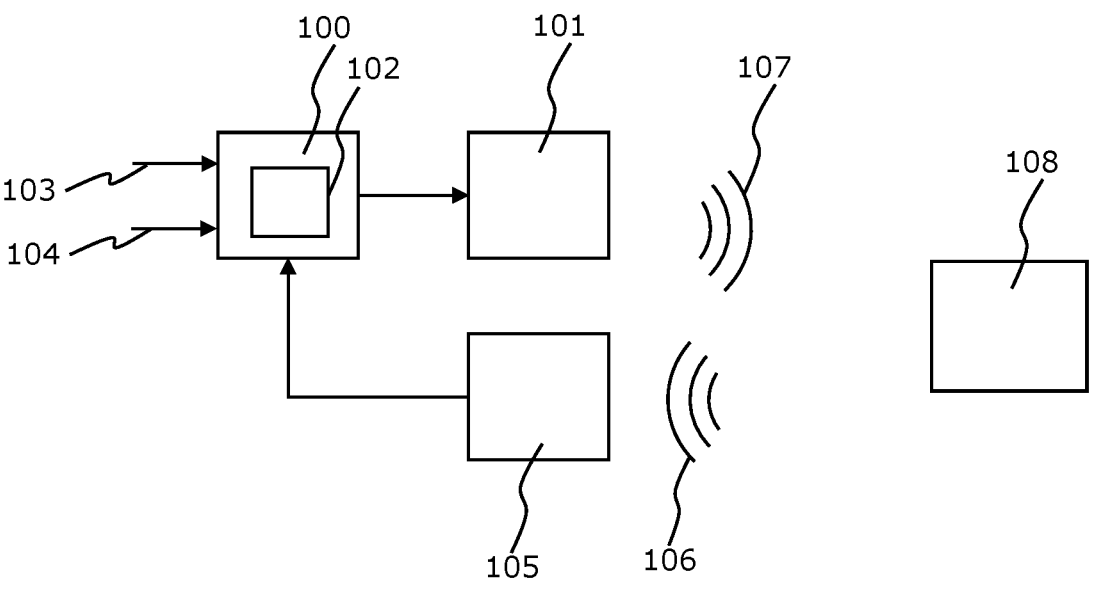
FIG. 1 shows an example embodiment of an apparatus for controlling a transmitter along with a transmitter and a receiver.

Example FIG. 1 shows an apparatus 100 configured to control a transmitter 101. The apparatus 100 comprises a processor 102 for providing instructions to the transmitter 101 to cause it to transmit a desired sequence of symbols. The processor 102 may comprise one or more processing devices and associated memory loaded with computer program code for providing the functions of the processor 102. The apparatus 100 may be configured to receive a data stream 103 comprising data to be transmitted and may represent that data as data-symbols and instruct the transmitter to transmit those data-symbols. The apparatus 100 may be configured to receive sensing information 104 for representing as sense-symbols and instruct the transmitter to transmit those sense-symbols. For example, the sensing information 104 may define the waveform desired for sensing for representing by the sense symbols. In other examples, the sense-symbols may be predetermined and therefore the receipt of the sensing information 104 may not be necessary.

Example FIG. 1 also shows a receiver 105 configured to receive signals 106 that were transmitted 107 by the transmitter 101 and have reflected from one or more objects 108 in the environment surrounding the transmitter 101.

The examples that follow describe the actions of the apparatus 100 and processor 102. However, in other examples, those actions may be performed by a combination of the apparatus 100 and the transmitter 101. Further, the actions may be performed by a combination of the apparatus 100, the transmitter 101 and the receiver 105.

Figure 2:
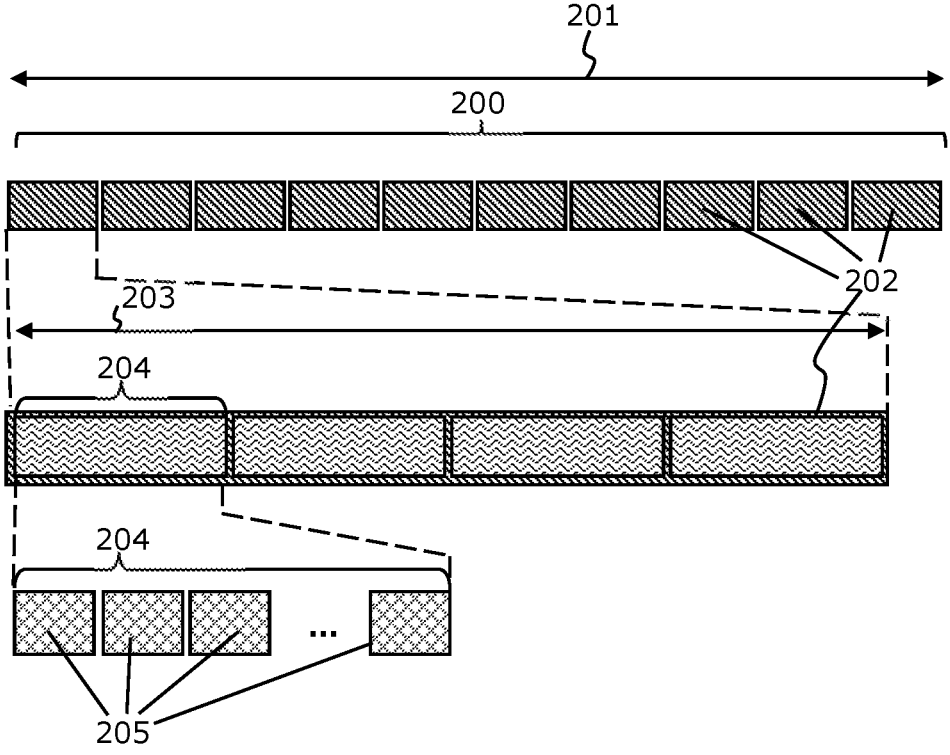
FIG. 2 shows a data frame, constituent sub-frames and constituent slots and constituent symbol time periods.

Example FIG. 2 shows an example data frame format used for conveying information. FIG. 2 shows a data frame 200 for transmission by the transmitter 101 at a selected one of a plurality of predetermined carrier frequencies. Thus, depending on the standard or protocol, the data frame may be provided at a number of different carrier frequencies.

In one or more examples, the data frame 200 has a fixed predetermined frame length, which in this example comprises 10 ms represented by arrow 201.

Each data frame 200 comprises fixed predetermined number of sub-frames 202. In the present example, each data frame 200 comprises ten sub-frames 202. Thus, each sub-frame 202 has a fixed predetermined duration of, in the present example, 1 ms represented by arrow 203.

In one or more examples, each sub-frame 202 may comprise a predetermined number of slots 204. In one or more examples, the number of slots in a sub-frame 202 is based on which of the plurality of predetermined carrier frequencies is selected for the present data frame 200. However, in other examples, the number of slots may be fixed. In the examples that follow, the sub-frame 202 comprises at least one slot, but the number of slots per sub-frame 202 may be between at least 2, 4, 8, 16 or more.

In examples where the number of slots is based on the selected carrier frequency, it will be appreciated that the temporal length of the slots may decrease as carrier frequency increases.

In the present example, each slot 204 includes a fixed number of symbol time periods 205. A symbol time period comprises the period of time during a slot 204 in which a single symbol is to be transmitted. Each symbol may comprise a particular signal pattern and cyclic prefix, in one or more examples. As mentioned above, there may comprise designated symbols used for communication, namely data-symbols. In one or more examples, there may be designated symbols used for sensing, namely sense-symbols. The sense-symbols may comprise a waveform, such as a chirp, for use in sensing the environment. A sense-symbol may not be restricted to a single symbol time period and may extend over a plurality of symbol time periods in some examples. In one or more examples, the sense-symbol has or the sense-symbols have a duration that extends over at least two consecutive symbol time periods in the sense-slots. Thus, the sense-symbols may be the same duration as the data-symbols or may have a duration longer than the data-symbols.

In the present examples, each slot 204 includes a fixed number of symbol time periods, such as fourteen. As will be appreciated, given that the slots 204 may have a variable duration depending on the carrier frequency, the fixed number of symbol time periods per slot results in the symbol time periods having a duration dependent on the carrier frequency.

Examples will now be described in which the frame format as described will be configured to carry both data-symbols and sense-symbols in a TDMA manner.

Thus, in general, the processor 100 may be configured to provide instructions to the transmitter 101 such that the transmitter 101, possibly based on further instructions and/or signals from one or more other sources, generates the symbols in the format of the aforementioned data frame 200 for transmission at a particular predetermined carrier frequency.

The processor 100 thus receives the data stream 103 for transmission. In order to provide for transmission of signals representing the data stream along with signals to provide said sensing of the environment, the processor is configured to designate, for the slots 204 of each sub-frame 202, at least one communication-slot and at least one sense-slot which are provided in a TDMA scheme. The communication-slots comprise slots for use in transmitting of data-symbols that represent said data stream 103 (which may or may not include control data for network control purposes). In one or more examples, the data-symbols available for use may be predefined and the processor may therefore translate the data stream 103 into the data-symbols. Thus, the processor 100 may be configured to generate the instructions for the transmitter 101 to generate the data-symbols that represent the data stream 103 in the respective symbol time periods of the communication-slots according to a predetermined encoding protocol.

The sense-slots comprise slots that each include one or more predetermined sense-symbols for use in sensing the environment. Thus, in the examples that follow, the sense-slots may comprise only the sense-symbols, and therefore exclude data-symbols that represent the data stream, or a combination of sense-symbols and data-symbols. Thus, the processor 100 may be configured to generate the instructions for the transmitter 101 to generate the predetermined sense-symbol(s) in at least one symbol time period of the at least one sense-slot. In examples where a sub-frame comprises one slot, it will be appreciated that in order for sensing and communication to occur that one slot may need to be a sense-slot also having data-symbols therein such that it may be, in effect, both a sense-slot and a communication-slot. Alternatively, only a subset of the sub-frames may comprise communication-slots and wherein the sub-frames outside the subset include sense-slot(s).

The time-division-multiple-access provision of data-symbols and sense-symbols may be advantageous and allow for substantially simultaneous communication and sensing without requiring a dedicated carrier frequency for sensing.

In one or more examples, each sub-frame 202 may comprise at least one, at least two or at least four sense-symbols or groups of consecutive sense-symbols. In one or more examples, at least every other slot 204 or every slot may include at least one sense-symbol or at least one group of consecutive sense-symbols.

In one or more examples, the time period between consecutive sense-symbols may constant at least over two adjacent sub-frames 202. The provision of a constant frequency of sense-symbols (i.e. constant time period between consecutive sense-symbols at least for a predetermined minimum time) may provide for accurate determination of the velocity of the object 108 in the environment.

Examples in which the sense-slots exclude data-symbols may be advantageous because the apparatus 100 may reserve slots 204 for sensing and the position of the sense-symbols in the "reserved" sense-slot may be freely selected without affecting the data-symbols. For example, in some examples, the free positioning of the sense-symbols in the sense-slot may be advantageous in ensuring the time period between consecutive sense-symbols is constant at least over the two adjacent sub-frames 202 or data frame 200.

Figure 3:
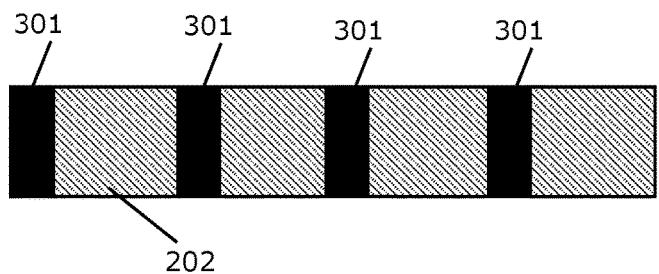
FIG. 3 shows a first example sub-frame having a plurality of data-symbols for carrying the data content of the data frame, such as for communication, and a plurality of sense-symbols for use in measuring the environment proximal the transmitter.

FIG. 3 shows a sub-frame of four or more slots 204 (as an example—the sub-frame may have fewer slots). Sense-symbols 301 are provided at regular times over the slots 204 to provide the sensing capability. It will be appreciated that the receiver 105 may be configured to identify the sense symbols in the received signal 106 in order to perform said sensing, as will be known to those skilled in the art. The identification of the sense symbols may be based on a correlation of the received signal 106 with the transmitted signal. In some examples, the processor 102 may receive the received signal from the receiver 105 to perform the sensing. In other examples, the processor 102 may inform the receiver 105 what form the sense symbols take in the transmitted signal 107 so that a processor associated therewith may identify them in the received signal 106. In other examples, the form of the sense-symbols may be known to the receiver 105.

A further example of a TDMA based sense-symbol and communication-symbol scheme will be described with reference to example FIG. 4.

In the following example the processor 102 is configured to generate instructions that provide for generation of the data-symbols not only in the respective symbol time periods of the communication-slots but also in the symbol time periods of the sense-slots that are not occupied by the predetermined sense-symbol(s). Thus, a "sense-slot", in this embodiment, comprises a slot 204 in which a sense-symbol(s) is present as well as data-symbols representing the data stream.

Figure 4:
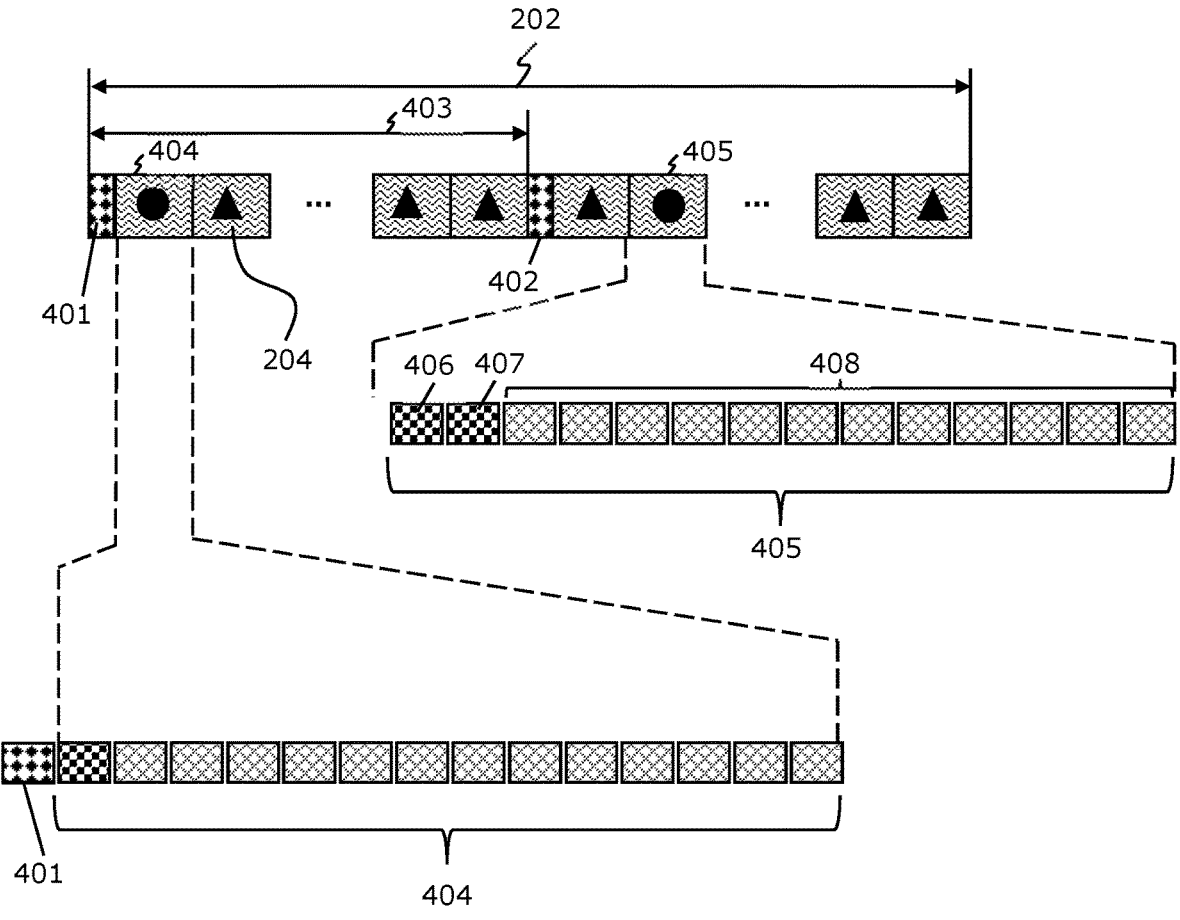
FIG. 4 shows a second example of a plurality of slots wherein one or more slots include one or more sense-symbols and the remainder of the slots include data-symbols.

FIG. 4 shows a plurality of slots 204 of a sub-frame 202. Slots 204 that are designated communication-slots are provided with a triangle symbol therein. Slots 204 that are designated sense-slots are provided with a circle symbol therein for ease of reference. As mentioned before, the sense-slots may include data-symbols as well as sense-symbols. In the present example each sub-frame 202 includes at least one guard interval 401, 402 (two per sub-frame are shown in this example) as well as said predetermined number of slots 204. The total time period provided for the guard intervals 401, 402 and the slots 204 may be 1 ms. Further, in the present example, one guard interval 401 is provided at the beginning of the sub-frame 202 and one guard interval 402 is provided after half the subframe 202, i.e. immediately after 0.5 ms shown by arrow 403. It will be appreciated that in other examples guard intervals are not part of the frame structure.

In the sub-frame 202 shown in FIG. 4, a first slot 404 comprises a sense-slot, and is designated by the circle symbol. A second slot 405 also comprises a sense-slot, also designated by the circle symbol. The remaining slots 204 of the sub-frame 202 comprise communication-slots, as designated by the triangle symbols. Beneath the sense-slots 404, 405 comprises an expanded view of the fourteen (in this example) symbol time periods for each slot and the types of symbols transmitted during those symbol time periods is indicated based on the shading.

The second sense-slot 405 provides an example of providing sense-symbols and data-symbols in the same slot. Thus, one or more examples may comprise providing sense-slots of this format independent of the first sense-slot 404 described later. Thus, the first two symbol time periods 406, 407 comprise sense-symbols. The remaining symbol time periods 408 include data-symbols. This may be advantageous because all the symbol time periods are utilised and the time division multiplexing of the sense-symbols and the data-symbols provides an effective way of providing sensing and communication together. Further, although the first two symbol time periods 406, 407 comprise sense-symbols in the present example, in other examples, the processor 102 may be configured to select a different two symbol time periods (e.g. fourth and fifth, or eighth to tenth) for the sense-symbols based on a requirement to provide the sense-symbols at regular intervals, which is advantageous when determining the velocity of objects 108.

In one or more examples, the processor 102 may be configured to provide one or at least one sense-slot each half sub-frame or each sub-frame for at least some or all of the sub-frames 202.

In one or more examples, the guard intervals 401, 402 may be configurable in duration and/or position. In one or more examples, the time duration of the guard interval may be utilised for providing for transmitting of sense-symbols.

The first sense-slot 404 provides an example of providing sense-symbols and data-symbols in the same slot as well as using the time provided for the guard interval. Thus, in the first sense-slot 404, a first of the symbol time periods is designated to include the one or more sense-symbols. Further, the guard interval 401 is also designated to include the one or more sense-symbols. Thus, a contiguous time period of the guard interval 401 and the first symbol time period of the sense-slot 404 that follows the guard interval 401 is configured to include the one or more sense-symbols. This may be advantageous because fewer symbol time periods are required for the sense symbols compared to, for example, the second sense-slot 405. Accordingly throughput of data is improved by using the guard interval 401 to provide time in the data frame for sense symbols.

Accordingly, the processor 102 is configured to, in the sense-slots 404 that are directly subsequent said guard interval 401, generate said sense-symbol such that it extends over said guard interval and at least a first of the symbol time periods. In one or more examples, the processor 102 may be configured to control the temporal size of the guard interval 401 such that it may accommodate the sense-symbol.

Figure 5:
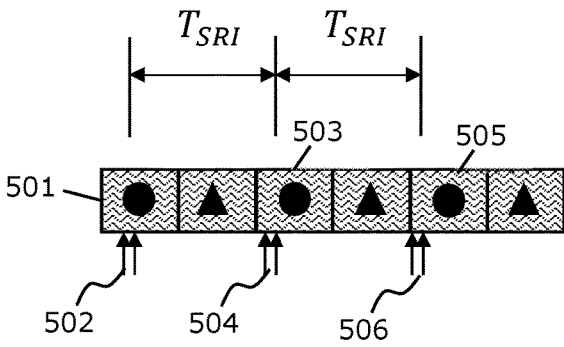
FIG. 5 shows equidistant sense-symbols for use in accurate velocity estimation of an object in the environment proximal the transmitter.

Example FIG. 5 shows a plurality of slots in which every other slot is sense-slot. The first sense-slot 501 includes two symbol time periods designated to carry the one or more sense symbols, designated by the pair of arrows 502. The second sense-slot 503 includes two symbol time periods designated to carry the one or more sense symbols, designated by the pair of arrows 504. The two symbol time periods 504 occur slightly earlier in the second sense-slot 503. The third sense-slot 505 includes two symbol time periods designated to carry the one or more sense symbols, designated by the pair of arrows 506. The two symbol time periods 506 occur slightly earlier in the third sense-slot 505 compared to the second sense-slot 503. However, the time between the two symbol time periods 502 and the two symbol time periods 504, as well as the time between the two symbol time periods 504 and the two symbol time periods 506 is constant as shown by $T_{SRI}$. Thus, the processor 102 adjusts the location of the sense symbols in respective time slots to provide a regular sense-symbol(s) which may improve the accuracy of velocity determination.

In the examples described thus far the sense-symbol may comprise a single symbol or signal or a plurality of symbols that extend for the duration of the symbol time periods, and optionally the guard interval 401, designated to carry it/them. The sense symbol(s) is therefore distinct from the data-symbols that provide the representation of the data stream used for communication. Such a TDMA based scheme is advantageous but provides a limit on the throughput in terms of communication because some time in the slots 204 is reserved for sense-symbols with only the remainder available for data-symbols. In the example that follows, an example form of the sense-symbol(s) will be described to improve communication throughput further.

In one or more examples, the form of the sense-symbol may be based on the data stream. Thus, the data-symbols themselves may be used for sensing as well as representing the data stream.

Figure 6:
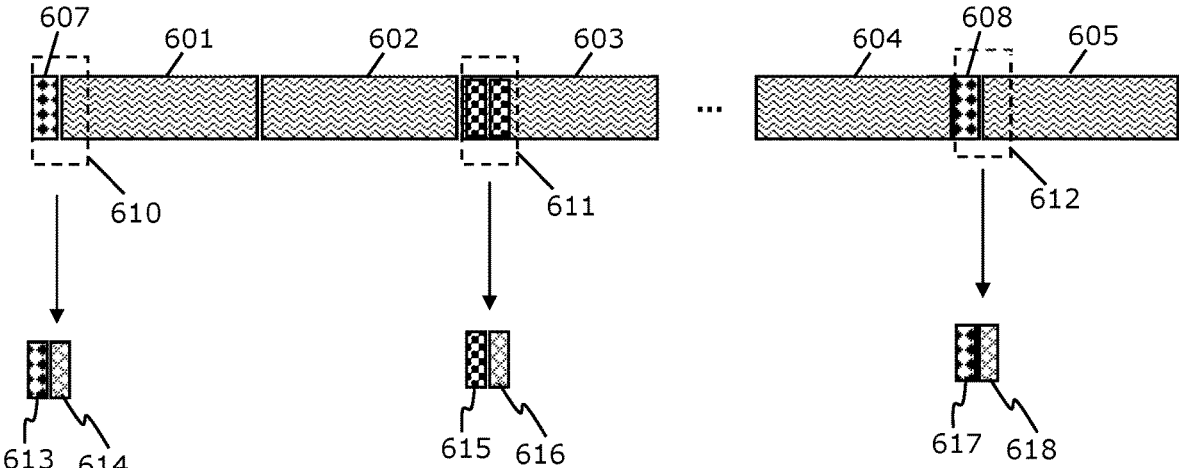
FIG. 6 shows a third example of a plurality of slots in which one or more of the slots include sense-symbols of a particular format to provide for efficient communication throughput.

Example FIG. 6 shows a plurality of slots 601, 602, 603, 604, 605. There are sense symbols 610, 611, 612 provided in a TDMA manner in those slots.

Considering the second sense-symbol(s) 611, the sense symbols are provided in a first symbol time period 615 and a directly subsequent second symbol time period 616 of the slot 603. The second symbol time period 616 is designated to carry a data-symbol that represents the data stream. The processor 102 is configured such that the first symbol time period 615 comprises a copy of the data-symbol in the second symbol time period 616. Thus, in this example embodiment, the sense-symbol actually comprises a data-symbol, in symbol time period 616, and a copy of the data symbol from symbol time period 616 in the symbol time period 615. In this example, despite the sense symbols requiring two symbol time periods, because they are formed of a copy of the data-symbol in one of the two symbol time periods, communication throughput is improved.

Thus, put another way, the sense-symbols generated by said processor 102 have a duration of at least two symbol time periods comprising the first symbol time period and the second symbol time period 616, wherein the second symbol time period 616 comprises a symbol time period having a data-symbol therein and at least the first symbol time period 615 directly adjacent the second symbol time period 616 comprises a copy of the data-symbol in the second symbol time period 616.

In such an example, the form of the sense-symbol(s) are dictated by whatever data is present in the data stream and is translated to data-symbols. The processor 102 may therefore record sense-symbol-description information that is indicative of the form of the sense-symbols 611 and provide the sense-symbol-description information to the receiver 105 for use in detecting the sense-symbols 611 in the received signal 106 that was transmitted by the transmitter 101 and reflected from objects 108 in the environment. This enables the receiver 105 to identify the sense-symbols in the received signal 106.

Example FIG. 6 also illustrates a further embodiment that still further improves communication throughput. As mentioned previously, the sub-frames may include one or more guard intervals 607, 608 between one, some or all of the slots 601-605 in the sub-frame.

If we consider the sense symbols 610, 612, the time of the guard interval is used to provide the sense symbols(s) similar to the embodiment above. However, in this example, the sense-symbols 610, 612 comprise a first symbol time period 614 and 618 which is designated to carry a data symbol for the purpose of communication. The guard interval 613 and 617 is configured to carry a copy of the data-symbol in the first symbol time periods 614 and 618.

Thus, the sense-symbol 610 takes the form of the data symbol that occupies the first symbol time period 614 and a repeat thereof in the guard interval 607. The sense-symbol 612 takes the form of the data symbol that occupies the first symbol time period 618 and a repeat thereof in the guard interval 608.

Thus, while the slots 601 and 605 are involved in the provision of sense-symbols, there are no symbol time periods lost to provide the sense-symbols. Those slots 601, 605 actually carry a full quota of data-symbols.

Again, the processor 102 may record sense-symbol-description information that is indicative of the form of the sense-symbols 610, 612 and provide the sense-symbol-description information to the receiver 105 for use in detecting the sense-symbols 610, 612 in the received signal 106 that was transmitted by the transmitter 101 and reflected from objects 108 in the environment. This enables the receiver 105 to identify the sense-symbols in the received signal 106.

Turning to the receiver 105, the receiver 105 and any associated processor 102 is configured to detect the sense-symbols 502, 504, 506, 610, 611, 612 in the received signal

106 and determine one or both of a range to or a velocity of the object 108. As will be known to those skilled in the art, range-Doppler processing of said sense-symbols may be utilised to determine said one or both of range or velocity.

Figure 7:
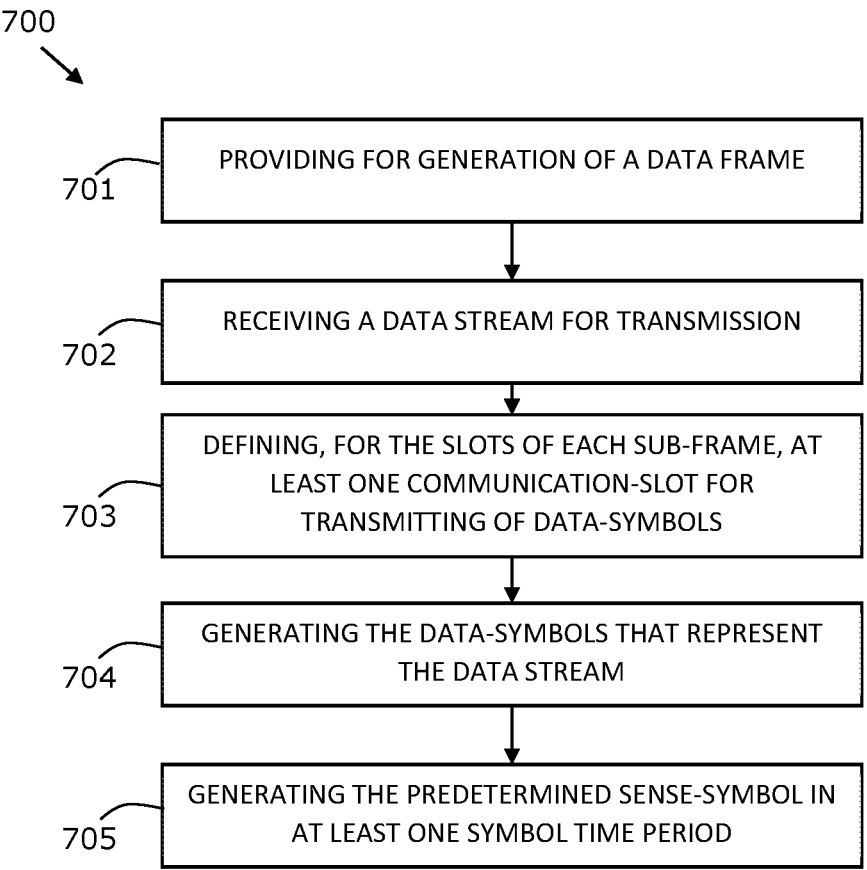
FIG. 7 shows a flowchart illustrating an example method.

FIG. 7 shows an example method 700. The method comprises: providing 701 for generation of a data frame for transmission by the transmitter at a selected one of a plurality of predetermined carrier frequencies, the data frames having a format comprising a fixed predetermined frame length, wherein each data frame comprises a fixed predetermined number of sub-frames, and each sub-frame comprises a predetermined number of slots based on which of the plurality of predetermined carrier frequencies is selected, and wherein each slot includes a fixed number of symbol time periods; receiving 702 a data stream for transmission; defining 703, for the slots of each sub-frame, at least one communication-slot for transmitting of data-symbols that represent said data stream and at least one sense-slot for transmitting a predetermined sense-symbol for use in sensing an environment proximal said transmitter; wherein the providing for generation of the data frame further comprises: generating 704 the data-symbols that represent the data stream, in the respective symbol time periods of the communication-slots, according to a predetermined encoding protocol, and generating 705 the predetermined sense-symbol in at least one symbol time period of the respective at least one sense-slot.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/ method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services.

As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus configured to control a transmitter, the apparatus comprising:

a processor configured to receive a data stream, and generate a data frame for transmission by the transmitter, wherein the data frame has a plurality of sub-frames, wherein each sub-frame of the plurality of sub-frames includes a plurality of slots, wherein in one or more sub-frames of the plurality of sub-frames, one or more first slots of the plurality of slots are defined as one or more communication slots, and one or more second slots of the plurality of slots, which are different from the first slots, are defined as one or more sense-slots, and wherein each slot of the plurality of slots includes a plurality of symbol time periods, and wherein generating the data frame includes generating first data-symbols that represent at least a portion of the data stream in at least one symbol time period of the plurality of symbol time periods of the one or more communication-slots of a first sub-frame of the plurality of sub-frames, according to a predetermined encoding protocol, and generating a first sense-symbol in at least one symbol time period of the plurality of symbol time periods of the one or more sense-slots of the first sub-frame, wherein the sense-symbol includes a waveform for use in sensing a characteristic of an object in a physical environment proximal the transmitter.

2. The apparatus of claim 1, wherein the plurality of slots in each sub-frame comprises at least two slots, and each sense-slot excludes data-symbols that represent the data stream.

3. The apparatus of claim 1, wherein the processor is configured to generate the first data-symbols by:

generating the first data-symbols that represent the data stream in the symbol time periods of the communication-slots and in the symbol time periods of the sense-slots that are not occupied by the first sense-symbol.

4. The apparatus of claim 1, wherein generating the data frame further comprises:

generating second data-symbols that represent at least a second portion of the data stream in at least one symbol time period of the plurality of symbol time periods of the one or more communication-slots of a second sub-frame of the plurality of sub-frames, according to the predetermined encoding protocol, generating a second sense-symbol in at least one symbol time period of the plurality of symbol time periods of the one or more sense-slots of the second sub-frame, generating third data-symbols that represent at least a third portion of the data stream in at least one symbol time period of the plurality of symbol time periods of the one or more communication-slots of a third sub-frame of the plurality of sub-frames, according to the predetermined encoding protocol, and generating a third sense-symbol in at least one symbol time period of the plurality of symbol time periods of the one or more sense-slots of the third sub-frame, wherein a time period between the first and second sense-symbols is the same as a time period between the second and third sense-symbols.

5. The apparatus of claim 4, wherein the processor is configured such that a position of the at least one symbol time period in the at least one sense-slot of each sub-frame during which the sense-symbol is generated is selected to provide a constant time period between consecutive sense-symbols.

6. The apparatus of claim 1, wherein the first sense-symbol has a duration that extends over at least two consecutive symbol time periods in the sense-slots.

7. The apparatus of claim 1, wherein each sub-frame includes at least one guard interval and a predetermined number of slots.

8. The apparatus of claim 7, wherein the processor is configured to define the at least one sense-slot per sub-frame as one of the slots directly subsequent the guard interval, and wherein the processor is configured to, in the sense-slots that are directly subsequent the guard interval, generate the first sense-symbol such that it extends over the guard interval and a first of the symbol time periods.

9. The apparatus of claim 1, wherein sense-symbols generated by the processor have a duration of at least two symbol time periods and comprise a first symbol time period comprising a symbol time period having a data-symbol therein and at least a second symbol time period directly adjacent the first symbol time period and comprising a copy of the data-symbol in the first symbol time period.

10. The apparatus of claim 1, wherein:

the processor is configured to define the one or more sense-slots per sub-frame as one of the slots directly subsequent the guard interval, said processor is configured to, in the sense-slots that are directly subsequent the guard interval, generate the sense-symbol such that it extends over the guard interval and a first of the symbol time periods, the first of the symbol time periods comprises a data-symbol and the guard interval comprises a copy of the data-symbol in the first of the symbol time periods, and the processor is configured to record sense-symbol-description information that is indicative of a form of the sense-symbols and provide the sense-symbol-description information to a receiver for use in detecting the sense-symbols in a received signal that was transmitted by the transmitter and reflected from the environment.

11. The apparatus of claim 1, wherein the waveform includes a chirp.

12. The apparatus of claim 1, wherein the characteristic of the object includes one or more characteristics selected from a group that consists of a range to the object and a velocity of the object.

13. An apparatus configured to control a transmitter, the apparatus comprising a processor configured to:

provide for generation of a data frame for transmission by the transmitter at a selected one of a plurality of predetermined carrier frequencies, the data frame having a fixed predetermined frame length, wherein the data frame comprises a fixed predetermined number of sub-frames, and each sub-frame comprises a number of slots, and wherein each slot includes a number of symbol time periods, receive a data stream for transmission, define, for the number of slots of each sub-frame, at least one communication-slot for transmitting of data-symbols that represent the data stream and at least one sense-slot for transmitting a predetermined sense-symbol for use in sensing an environment proximal the transmitter, wherein the generation of the data frame further includes the generation of the data-symbols that represent the data stream, in the respective symbol time periods of the at least one communication-slot, according to a predetermined encoding protocol, and the generation of the predetermined sense-symbol in at least one symbol time period of the at least one sense-slot; and a receiver configured to:

receive a signal that was transmitted by the transmitter and reflected from an environment proximal the transmitter and proximal the receiver, detect the sense-symbols in the received signal, and determine one or both of a range to or a velocity of an object in the environment based at least on range-Doppler processing of the sense-symbols.

14. A method comprising:

receiving a data stream by a processor that is configured to control a transmitter, and generating, by the processor, a data frame for transmission by the transmitter, wherein the data frame has a plurality of sub-frames, wherein each sub-frame of the plurality of sub-frames includes a plurality of slots, wherein in one or more sub-frames of the plurality of sub-frames, one or more first slots of the plurality of slots are defined as one or more communication slots, and one or more second slots of the plurality of slots, which are different from the first slots, are defined as one or more sense-slots, and wherein each slot of the plurality of slots includes a plurality of symbol time periods, and wherein generating the data frame includes generating first data-symbols that represent at least a portion of the data stream in at least one symbol time period of the plurality of symbol time periods of the one or more communication-slots of a first sub-frame of the plurality of sub-frames, according to a predetermined encoding protocol, and generating a first sense-symbol in at least one symbol time period of the plurality of symbol time periods of the one or more sense-slots of the first sub-frame, wherein the sense-symbol includes a waveform for use in sensing a characteristic of an object in a physical environment proximal the transmitter.

15. The method of claim 14, wherein generating the data frame further comprises:

generating second data-symbols that represent at least a second portion of the data stream in at least one symbol time period of the plurality of symbol time periods of the one or more communication-slots of a second sub-frame of the plurality of sub-frames, according to the predetermined encoding protocol;

generating a second sense-symbol in at least one symbol time period of the plurality of symbol time periods of the one or more sense-slots of the second sub-frame;

generating third data-symbols that represent at least a third portion of the data stream in at least one symbol time period of the plurality of symbol time periods of the one or more communication-slots of a third sub-frame of the plurality of sub-frames, according to the predetermined encoding protocol; and generating a third sense-symbol in at least one symbol time period of the plurality of symbol time periods of the one or more sense-slots of the third sub-frame, wherein a time period between the first and second sense-symbols is the same as a time period between the second and third sense-symbols.

16. The method of claim 14, wherein generating the first data symbols further comprises:

generating the first data-symbols that represent the data stream in the symbol time periods of the communication-slots and in the symbol time periods of the sense-slots that are not occupied by the first sense-symbol.

17. The method of claim 14, wherein the plurality of slots in each sub-frame comprises at least two slots, and each sense-slot excludes data-symbols that represent the data stream.

18. The method of claim 14, wherein generating the data frame further comprises:

generating second data-symbols that represent at least a second portion of the data stream in at least one symbol time period of the plurality of symbol time periods of the one or more communication-slots of a second sub-frame of the plurality of sub-frames, according to the predetermined encoding protocol, generating a second sense-symbol in at least one symbol time period of the plurality of symbol time periods of the one or more sense-slots of the second sub-frame, generating third data-symbols that represent at least a third portion of the data stream in at least one symbol time period of the plurality of symbol time periods of the one or more communication-slots of a third sub-frame of the plurality of sub-frames, according to the predetermined encoding protocol, and generating a third sense-symbol in at least one symbol time period of the plurality of symbol time periods of the one or more sense-slots of the third sub-frame, wherein a time period between the first and second sense-symbols is the same as a time period between the second and third sense-symbols.

19. The method of claim 14, wherein the first sense-symbol has a duration that extends over at least two consecutive symbol time periods in the sense-slots.

20. The method of claim 14, wherein each sub-frame includes at least one guard interval and a predetermined number of slots.

21. The method of claim 20, further comprising:

defining the at least one sense-slot per sub-frame as one of the slots directly subsequent the guard interval; and in the sense-slots that are directly subsequent the guard interval, generating the first sense-symbol such that it extends over the guard interval and a first of the symbol time periods.

22. The method of claim 14, further comprising:

receiving, by a receiver, a signal that was transmitted by the transmitter and reflected from the object in the physical environment proximal the transmitter and proximal the receiver;

detecting the first sense-symbol in the received signal; and determining one or both of a range to or a velocity of the object in the physical environment based at least on range-Doppler processing of the first sense-symbol.

\*    \*    \*    \*    \*